Feb. 17, 1942. R. R. SEARLES 2,273,379
LOCKING MEANS FOR BEARING RINGS
Filed Dec. 7, 1938
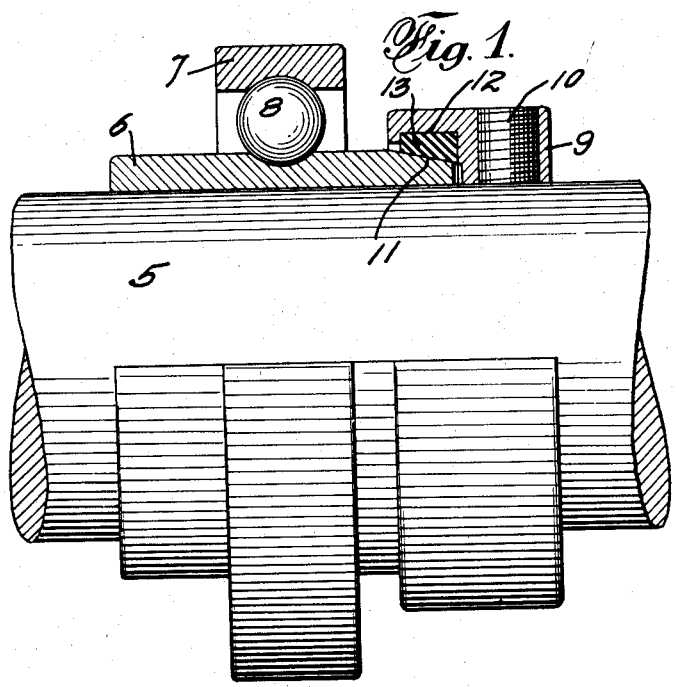
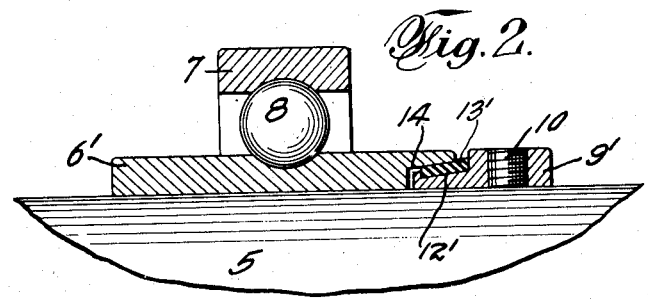
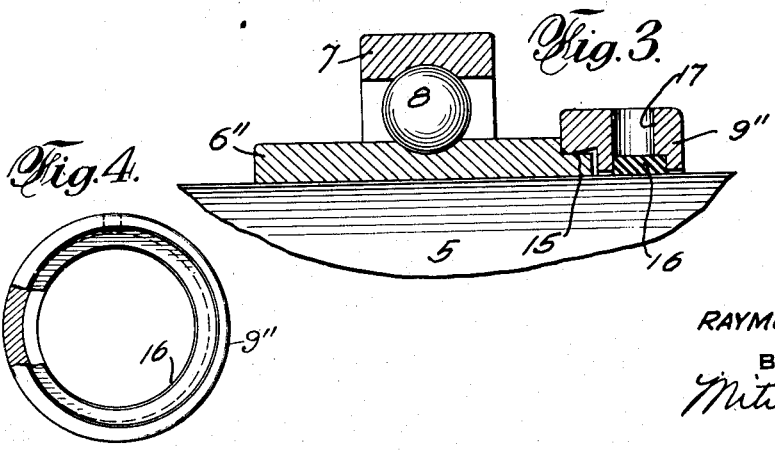
INVENTOR
RAYMOND R. SEARLES
BY
Mitchell Bechert
ATTORNEYS.

Patented Feb. 17, 1942

2,273,379

UNITED STATES PATENT OFFICE 2,273,379

LOCKING MEANS FOR BEARING RINGS

Raymond R. Searles, New Britain, Conn., assignor to The Fafnir Bearing Company, New Britain, Conn., a corporation of Connecticut Application December 7, 1938, Serial No. 244,340

6 Claims. (Cl. 287—52)

My invention relates to locking means for a bearing ring.

It is usual to lock or secure the inner bearing ring of an anti-friction bearing to the shaft through the inner ring. Various locking devices have heretofore been proposed.

It is an object of my invention to provide an improved locking means for the inner ring of an anti-friction bearing, which locking means is simple, cheap to manufacture, easy to apply and effective in use.

It is a further object to provide an improved form of locking means for the inner ring of an anti-friction bearing which, while quite securely holding the inner ring, will permit slight movement thereof.

It is another object to provide an improved form of resilient means for locking the inner ring of an anti-friction bearing to the shaft.

Other objects and various features of novelty and invention will be hereinafter pointed out or will become apparent to those skilled in the art.

In the drawing which shows, for illustrative purposes only, preferred forms of the invention—

Fig. 1 is an edge view in quarter section of a ball bearing and locking means on a shaft and illustrating one form of the invention;

Fig. 2 is a fragmentary view similar to Fig. 1, illustrating a slight modification;

Fig. 3 is a view similar to Fig. 2, illustrating still another modification; and Fig. 4 is an end view of the locking collar shown in Fig. 3, a part being broken away.

In said drawing 5 indicates a shaft for receiving the inner ring 6 of an anti-friction bearing, including the inner ring 6, outer ring 7 and anti-friction bearing members such as balls 8.

My invention relates to the means for securing the inner ring 6 to the shaft. It may be here stated that the inner ring 6 may be caused to abut against a shoulder or nut at the left-hand side or a locking means of any suitable type, for example, the type to be hereinafter described may be applied to the shaft at the left-hand side of the ring 6.

In the form shown in Fig. 1 there is a locking collar or ring 9 surrounding the shaft and which may be secured thereto, as by means of a headless set screw 10. The locking ring 9 and one end of the inner ring 6 have overlapping parts and a resilient or yielding member is interposed between and held by one of those parts. As illustrated, the inner ring has one end provided with an external taper 11 and the locking ring 9 at the part overlapping the end of the inner ring is provided with a circumferentially extending internal groove 12, carrying a resilient ring 13, which forcibly and resiliently engages the taper surface 11. The ring 13 is preferably a continuous annular ring of yielding material, such as artificial rubber, and the term "rubber" as used in this application is intended to include rubber, whether artificial or natural, or other similar yielding means. Artificial rubbers are now well known and some such materials are known to the trade as "Thiokol," "Duprene," "Neoprene," etc. The rubber ring 13 is preferably provided with a tapered surface to engage the taper surface 11 on the inner ring. When it is desired to lock the inner ring 6 to the shaft the locking ring 9 is pushed up so as to cause the ring 13 to forcibly and resiliently engage the taper surface 11. A slight relative rotation between the rings 6 and 9 serves to increase the grip between the rubber ring and the inner ring. Generally speaking the tighter the ring 9 is forced up over the ring 6 the more secure will be the locking of the inner ring to the shaft. When the inner ring is locked the set screw 10 is set up. The resilient character of the ring 13 will permit slight movement of the inner ring 6 and will tend to maintain the same in concentric relationship to the shaft 5. The ring 6 may be unlocked from the shaft by merely loosening the set screw and withdrawing the locking ring 9 toward the right.

In that form of the invention shown in Fig. 2 the inner ring 6', instead of having an external tapered surface, has a tapered counterbore 14 therein. The locking ring 9', similar to that heretobefore described, instead of having an internal circumferentially extending groove, is provided with an external groove 12' for receiving the annular rubber ring 13'. The action is substantially the same as that heretofore noted, the difference being the reversal of the surfaces; that is, the ring 9 of Fig. 1 is larger and overlaps the end of the inner ring, while in Fig. 2 the inner ring is counterbored and the locking ring 9' has an end extending into such counterbore.

In Fig. 3 the inner ring 6'' is secured to the shaft by means of a direct engagement between the locking ring 9'' and the inner bearing ring. Such interengaging surfaces as indicated at 15 are eccentrically formed, so that upon a slight relative rotation between the rings 6''—9'' both rings will be caused to bind on the shaft. The locking ring 9'' in the present instance is provided with a groove for receiving an annular rubber ring 16, fitting the outer surface of the shaft 5. The locking ring 9" may be secured to the shaft through the medium of the rubber ring 16 merely by its gripping action upon relative rotation of the rings 6"—9", which relative rotation, as heretofore indicated, causes both rings to tend to move eccentrically of the shaft. However, if desired, a set screw may be threaded into the hole 17 in the collar 9" and may engage the rubber ring 16 or extend through a hole (not shown) therein directly into engagement with the shaft 5, the same as in the other modifications illustrated.

While the invention has been described in considerable detail and preferred forms illustrated, it is to be understood that various changes and modifications may be made within the scope of the invention as defined in the appended claims.

I claim:

1. In a locking means for the inner ring of an anti-friction bearing including inner and outer bearing rings with interposed anti-friction bearing members, a locking ring, means for securing the same to a shaft, and an annular rubber ring interposed between said locking ring and said inner bearing ring for resiliently locking said latter rings together.

2. In a locking means for the inner ring of an anti-friction bearing including inner and outer bearing rings with interposed anti-friction bearing members, a locking ring, means for securing the same to a shaft, said inner ring and locking ring having overlapping end surfaces, an annular rubber ring interposed between said overlapping surfaces, one of said last rings having shoulder means for holding said rubber ring thereon, for the purpose described.

3. In a locking means for the inner ring of an anti-friction bearing including inner and outer bearing rings with interposed anti-friction bearing members, said inner ring at one end having a longitudinally tapered bearing surface, a locking ring having one end overlapping said tapered bearing surface, means for securing said locking ring to a shaft, and a rubber ring carried by said locking ring and forcibly engaging said tapered surface on said inner bearing ring, for the purpose described.

4. In a locking means for the inner ring of an anti-friction bearing including inner and outer bearing rings with interposed anti-friction bearing members, a locking ring means for securing the same to a shaft, said locking ring having a circumferentially extending groove therein, a rubber ring mounted in said groove and bodily carried by said locking ring, said inner bearing ring having one end in forcible engagement with said rubber ring, for the purpose described.

5. In a locking means for the inner ring of an anti-friction bearing including inner and outer bearing rings with interposed anti-friction bearing members, a locking ring, means for securing the same to a shaft, said inner ring and locking ring having substantially concentrically arranged overlapping parts, one of said last mentioned rings having a circumferentially extending groove therein, a rubber ring mounted in said groove and carried by said ring having said groove, said rubber ring being forcibly engaged with the other of said last mentioned rings.

6. In a locking means for the inner ring of an anti-friction bearing including inner and outer bearing rings with interposed anti-friction bearing members, a locking ring having a bore to fit a shaft in the bore of the inner bearing ring, said locking ring and inner bearing ring having overlapping portions, and means formed of rubber and interposed between said overlapping portions of said locking ring and said inner bearing ring for resiliently locking said latter rings together.

RAYMOND R. SEARLES.